United States Patent
Kuroda et al.

(10) Patent No.: US 6,636,785 B2
(45) Date of Patent: Oct. 21, 2003

(54) COMMUNICATIONS CONTROL APPARATUS AND METHOD FOR AUTOMOTIVE VEHICLE

(75) Inventors: Koichi Kuroda, Yokohama (JP); Takuo Ishiwaka, Yokohama (JP); Toru Takagi, Yokohama (JP); Susumu Fujita, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 21 days.

(21) Appl. No.: 10/216,774

(22) Filed: Aug. 13, 2002

(65) Prior Publication Data

US 2003/0036824 A1 Feb. 20, 2003

(30) Foreign Application Priority Data

Aug. 13, 2001 (JP) ........................................ 2001-245671

(51) Int. Cl.[7] .................................................. G05D 1/00
(52) U.S. Cl. ............................ 701/1; 701/25; 340/998
(58) Field of Search ............................ 701/1, 25, 200, 701/201, 202, 207, 208, 209, 213, 215; 340/998, 991; 342/457, 46

(56) References Cited

U.S. PATENT DOCUMENTS 4,982,359 A * 1/1991 Kamiyama et al. ......... 701/200
5,926,117 A * 7/1999 Gunji et al. ................. 340/988

FOREIGN PATENT DOCUMENTS

| JP | 5-199167 | | 8/1993 | |
| JP | 404184117 | * | 7/2002 | ........... G01C/21/00 |

* cited by examiner

*Primary Examiner*—Marthe Y. Marc-Coleman
(74) *Attorney, Agent, or Firm*—McDermott, Will & Emery

(57) ABSTRACT

In communications control apparatus and method for an automotive vehicle, a buffer enabling quantity by which data of the requested content is enabled to be buffered into a receiving buffer during a vehicular run on the traveling scheduled route is calculated using a traveling time and a communication speed; and a capacity of the receiving buffer is set according to a calculated result of the buffer enabling quantity calculation described above and an upper limit value of the receiving buffer capacity, data on a requested content being downloaded onto the receiving buffer whose capacity is set.

20 Claims, 10 Drawing Sheets

| POSITION | A<br>INTERVAL<br>BETWEEN A AND B | B | INTERVAL<br>BETWEEN B AND C | C | INTERVAL<br>BETWEEN C AND D | D |
|---|---|---|---|---|---|---|
| ELECTROMAGNETIC WAVE ENVIRONMENTAL DATA — WAVE RECEIVING ENVIRONMENT | D1 | | D2 | | D1 | |
| PREDICTED FROM WAVE RECEIVING ENVIRONMENT — COMMUNICATION SPEED | f | | p | | f | |
| BUFFERING ENABLING QUANTITY | $B_{ab} = (f-S_v) \times \ell_a / V_1$ | | $B_{bc} = (p-S_v) \times \ell_b / V_2$ | | $B_{cd} = (f-S_v) \times \ell_c / V_2$ | |
| TRAVELING TIME | $T_{ab} = \ell_a / V_1$ | | $T_{bc} = \ell_b / V_2$ | | $T_{cd} = \ell_c / V_2$ | |
| EXTENDED DISTANCE | $\ell_a$ | | $\ell_b$ | | $\ell_c$ | |
| TRAVELING SPEED | $V_1$ | | $V_2$ | | $V_2$ | |

COMMUNICATIONS CONTROL APPARATUS AND METHOD FOR AUTOMOTIVE VEHICLE

BACKGROUND OF THE INVENTION

1. Field of the Invention

The present invention relates to communications control apparatus and method for a mobile body such as an automotive vehicle which communicate with another communication party via an electromagnetic wave.

2. Description of the Related Art

A communication countermeasure in a previously proposed vehicular communications control apparatus at an interval in which an electromagnetic wave environment is not favorable is exemplified by a Japanese Patent Application First Publication No. Heisei 5-199167 published on Aug. 6, 1993. In a car phone disclosed in this Japanese Patent Application Publication, a received level state obtained when the vehicle has traveled is stored in connection with the interval of an electromagnetic wave environment map and this electromagnetic wave state map information is displayed in a telephone call state. Thus, a vehicular driver can select a traveling route at which a favorable electromagnetic wave received state can be obtained.

SUMMARY OF THE INVENTION

Communication tools which perform wireless communications between the vehicle and another communication party include, in addition to the car phone, a recent communications device which transmits and receives a content of a, so-called, stream type in which downloaded data such as music, news, weather forecast, and internet radio are once buffered (stored in a buffer) and the information is continued to be play-backed.

When the above-described communications device disclosed in the above-described Japanese Patent Application First Publication is mounted in the vehicle disclosed in the above-described Japanese Patent Application Publication, the vehicle travels while selecting the interval of the traveling route in which the electromagnetic wave environment is favorable. However, according to a traveling situation, the vehicle is often needed to travel in the interval thereof in which the electromagnetic wave environment is not favorable. In this case, even if the stream type content is tried to be downloaded, the download is often interrupted at the interval in which the electromagnetic wave environment is not favorable.

It is, therefore, an object of the present invention to provide communications control apparatus and method which can predict a quantity required for a play-back of a data at an interval of a traveling scheduled route at which the electromagnetic wave environment is bad and at which the download of the content is not possible, can previously reserve the corresponding data quantity at another interval before the vehicle reaches to the above-described interval, at the other interval the electromagnetic wave environment being favorable, and can play-back the stream-type content without interruption even if the vehicle is passing through the above-described interval at which the electromagnetic wave environment is bad.

According to one aspect of the present invention, there is provided a communications control apparatus for an automotive vehicle, comprising: a road map storing section that stores a road map data; an electromagnetic wave environmental data storing section that stores an electromagnetic wave environmental data; a vehicular position retrieving section that retrieves a position of the vehicle; a traveling time predicting section that predicts a traveling time for which the vehicle travels on a traveling scheduled route using the road map data; a communication speed predicting section that predicts a communication speed when the vehicle travels on the traveling scheduled route using the electromagnetic wave environmental data; a playback speed retrieving section that retrieves a playback speed of a requested content; a buffer enabling quantity calculating section that calculates a buffer enabling quantity by which data of the requested content is enabled to be buffered into a receiving buffer during a vehicular run on the traveling scheduled route using the traveling time obtained from the traveling time predicting section and the communication speed obtained from the communication speed predicting section; and a receiving buffer setting section that sets a capacity of the receiving buffer according to a calculated result of the buffer enabling quantity calculating section and an upper limit value of the receiving buffer capacity the data of the requested content being downloaded onto the receiving buffer whose capacity is set by the receiving buffer setting section.

According to another aspect of the present invention, there is provided a communications control method for an automotive vehicle, comprising: storing a road map data; storing an electromagnetic wave environmental data; retrieving a position of the vehicle; predicting a traveling time for which the vehicle travels on a traveling scheduled route using the road map data; predicting a communication speed when the vehicle travels on the traveling scheduled route using the electromagnetic wave environmental data; retrieving a playback speed of a requested content; calculating a buffer enabling quantity by which data of the requested content is enabled to be buffered into a receiving buffer during a vehicular run on the traveling scheduled route using the traveling time obtained during the traveling time predicting and the communication speed obtained during the communication speed predicting; and setting a capacity of the receiving buffer according to a calculated result of the buffer enabling quantity calculating section and an upper limit value of the receiving buffer capacity, the data of the requested content being downloaded onto the capacity set receiving buffer.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
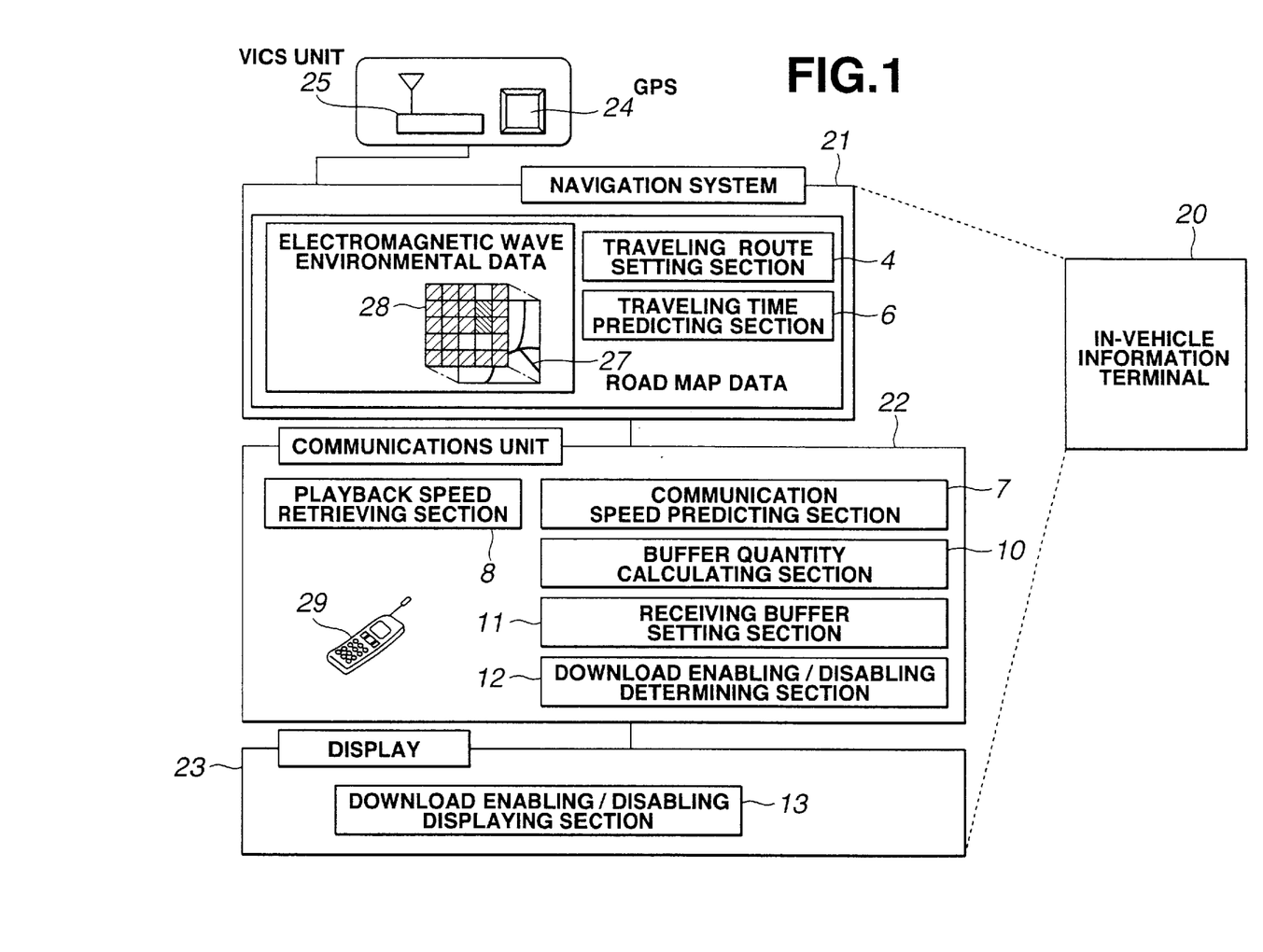
FIG. 1 is a rough configuration of a vehicular communications control apparatus in a first preferred embodiment according to the present invention.

FIG. 1 shows a hardware structure of a communications control apparatus for an automotive vehicle in a first preferred embodiment according to the present invention. In the first embodiment, a navigation system 21, a communications unit 22, and a display 23 are integrated together to constitute an in-vehicle information terminal 20. Navigation system 21 is connected with a GPS (Global Positioning System) receiving section 24 that receives GPS electromagnetic waves from a plurality of satellites to obtain a positional information on the vehicle (also called, host vehicle) and VICS (Vehicle Information and Communication System) unit 25 that obtains an information (traffic information) on a traffic situation from FM multiplex broadcasting, electromagnetic beacons, or optical beacons. In addition, navigation system 21 includes a road map data storing section on a road map data 27, an electromagnetic wave environmental data storing section 28 on an electromagnetic wave environmental data, a traveling route setting section 4, and traveling time predicting section 6.

Communications unit 22 includes a communication speed predicting section 7, a playback speed retrieving section 8, a buffer enabling quantity calculating section 10, a receiving buffer setting section 11, and a download enabling/disabling (enabling or disabling) determining section 12. It is noted that a driver's handy phone 29 is connected to and used for a communication function portion of communications unit 22. A display 23 includes a download enabling/disabling displaying section 13 and a navigation image of navigation system 21 is also enabled to be displayed.

Figure 2:
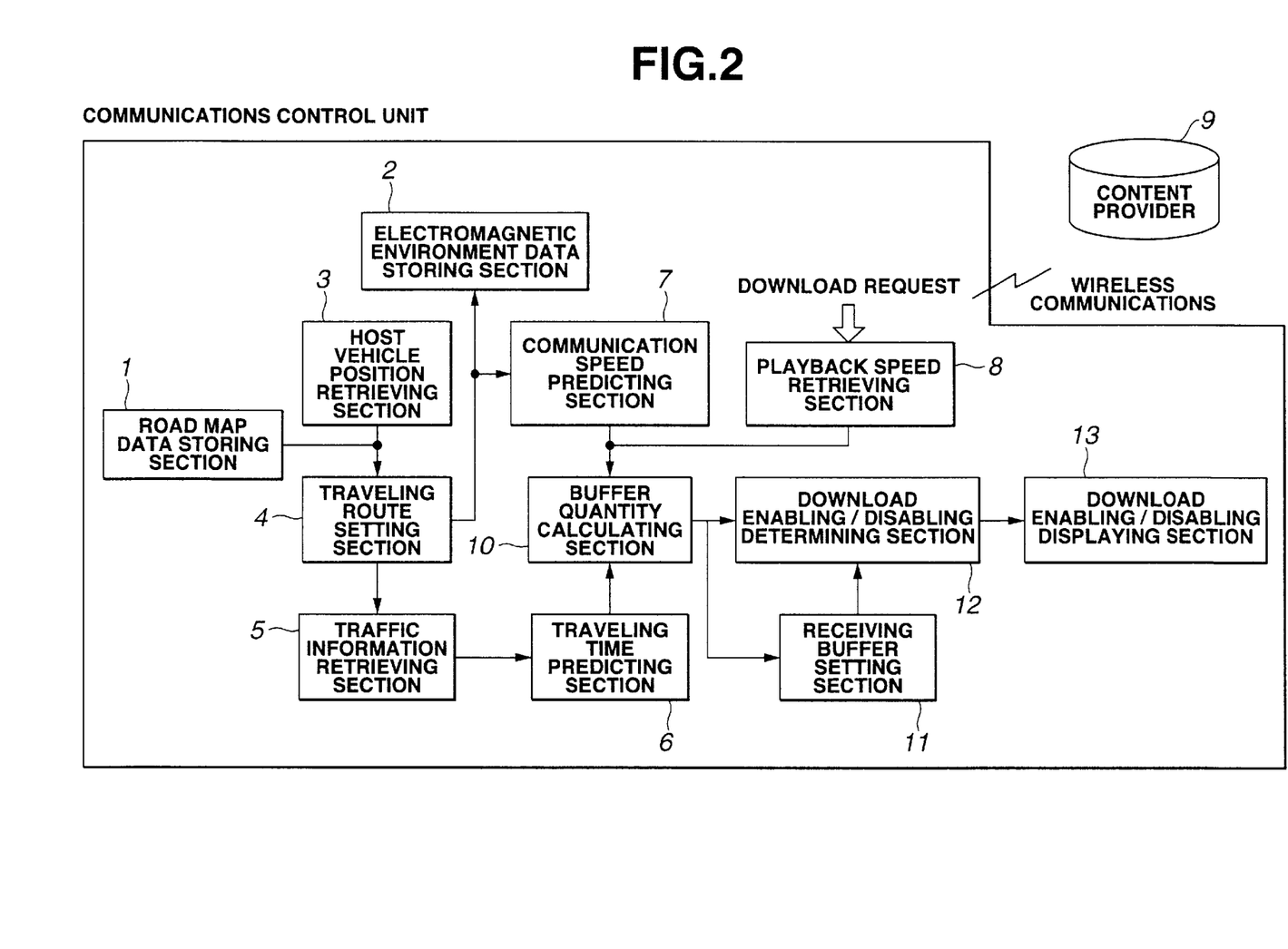
FIG. 2 is a functional block diagram of the whole communications control apparatus in the first embodiment shown in FIG. 1.

FIG. 2 shows a functional block diagram of the whole communications control apparatus in the first embodiment shown in FIG. 1.

Road map data storing section 1 stores the above-described road map data 27 including road map data for a navigation purpose. Electromagnetic wave environmental data storing section 2 stores accumulatively electromagnetic wave environmental data 28 in association with the above-described road map data 27. Electromagnetic wave environmental data 28 detects, for example, received level state of electromagnetic waves radiated from a stationary station, is generated in association with the above-described road map data 27, and is, thereafter, available. Electromagnetic wave environmental data storing section 2 is with electromagnetic wave environmental data already inputted thereinto, or alternatively, may store added or corrected electromagnetic wave environmental data to the previously inputted data using actually measured data.

Vehicle position retrieving section 3 retrieves a present position of the vehicle and is constituted by GPS 24 and navigation system 21. Traveling route setting section 4 sets a traveling scheduled route to a destination. Traffic information retrieving section 5 receives a traffic situation information such as a traffic congestion state of a location surrounding the traveling scheduled route. In this case, traffic information retrieving section 5 utilizes, for example, VICS (Vehicle Information and Communication System).

Traveling time predicting section 6 serves to estimate a traveling time from a kind of road of the traveling scheduled route obtained from the road map data in road map data storing section 1 and the traffic situation retrieved from traffic information retrieving section 5. It is noted that the road map data such as the kind of road from road map data storing section 1 is supplied together with data retrieved from traffic information retrieving section 5 to traveling time predicting section 6. Traveling time predicting section 6 estimates a traveling time by dividing a traveling scheduled distance derived from road map data 27 by a traveling speed stored in correspondence with road map data 27 or a traveling speed obtained from traffic information retrieving section 5. It is noted that, as will be described later, the traveling time is set for each traveling interval on the traveling scheduled route.

Communication speed predicting section 7 reads an electromagnetic wave environmental data on the traveling scheduled route determined at traveling route setting section 4 from electromagnetic wave environmental data storing section 2 and predicts a communication speed at the traveling scheduled route from the electromagnetic environmental data on the traveling scheduled route. Playback speed retrieving section 8 retrieves a play-back speed of a content requested by scanning an input section (not shown) by a vehicular driver from content provider external to the vehicle.

Buffer quantity calculating section 10 calculates a required buffer quantity from the traveling time on the traveling scheduled route obtained from traveling time predicting section 6, a predicted value of the communication speed obtained by communication speed predicting section 7, and the playback speed of the content obtained by the playback speed retrieving section 8. Receiving buffer setting section 11 serves to secure a receiving buffer region with an optimum buffer capacity on a system memory.

Download enabling/disabling determining section 12 determines whether the download of the requested content is enabled or not from a settable receiving buffer quantity secured at receiving buffer setting section 11 and the required data quantity calculated at buffer quantity calculating section 10. Download enabling/disabling displaying section 13 serves to produce a result of determination by download enabling/disabling determining section 12 to the driver.

Next, an operation of the communications control apparatus in the first embodiment described above will be described below.

Figure 3:
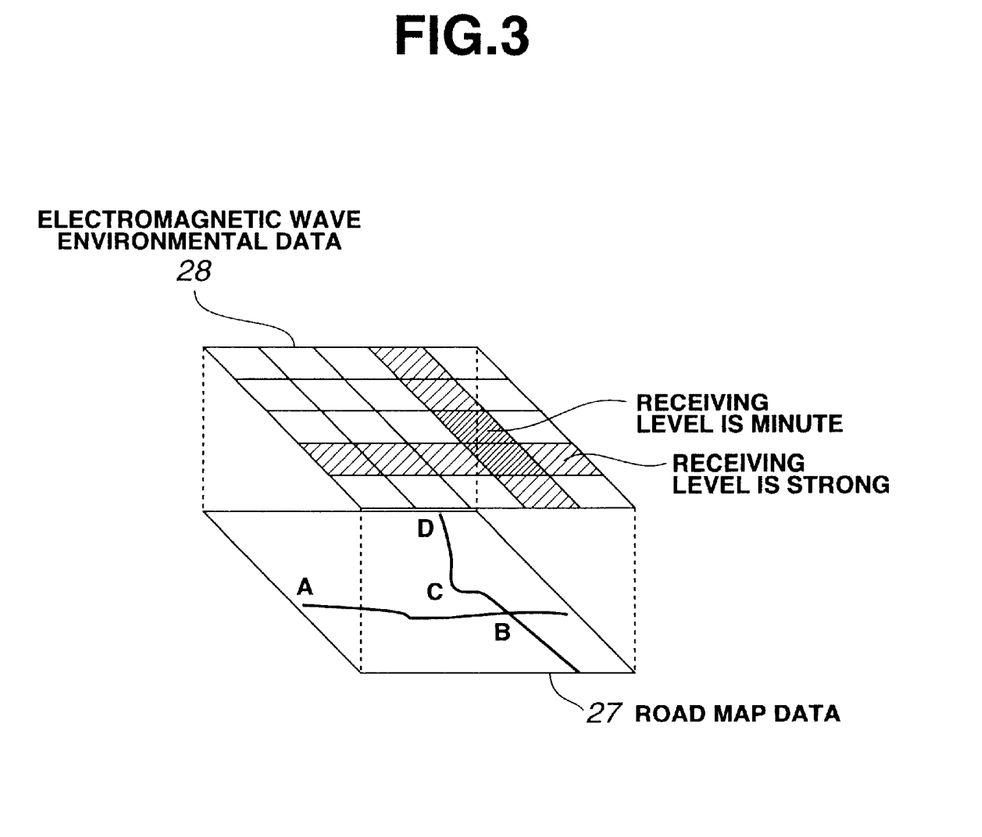
FIG. 3 is an explanatory view representing an overlap of an electromagnetic environmental data on a road map data indicating a traveling scheduled route for explaining an operation of the communications control apparatus in the first embodiment shown in FIG. 1.

For example, as shown in FIG. 3, suppose a case wherein the traveling scheduled route is a route described on road map data 27 (a point of place A→point of place B→point of place C→point of place D) and the electromagnetic wave environment on the running scheduled route enclosed by a bracket described above (viz., electromagnetic wave received level) becomes minute at an interval between point of place B and point of place C.

Figure 4:
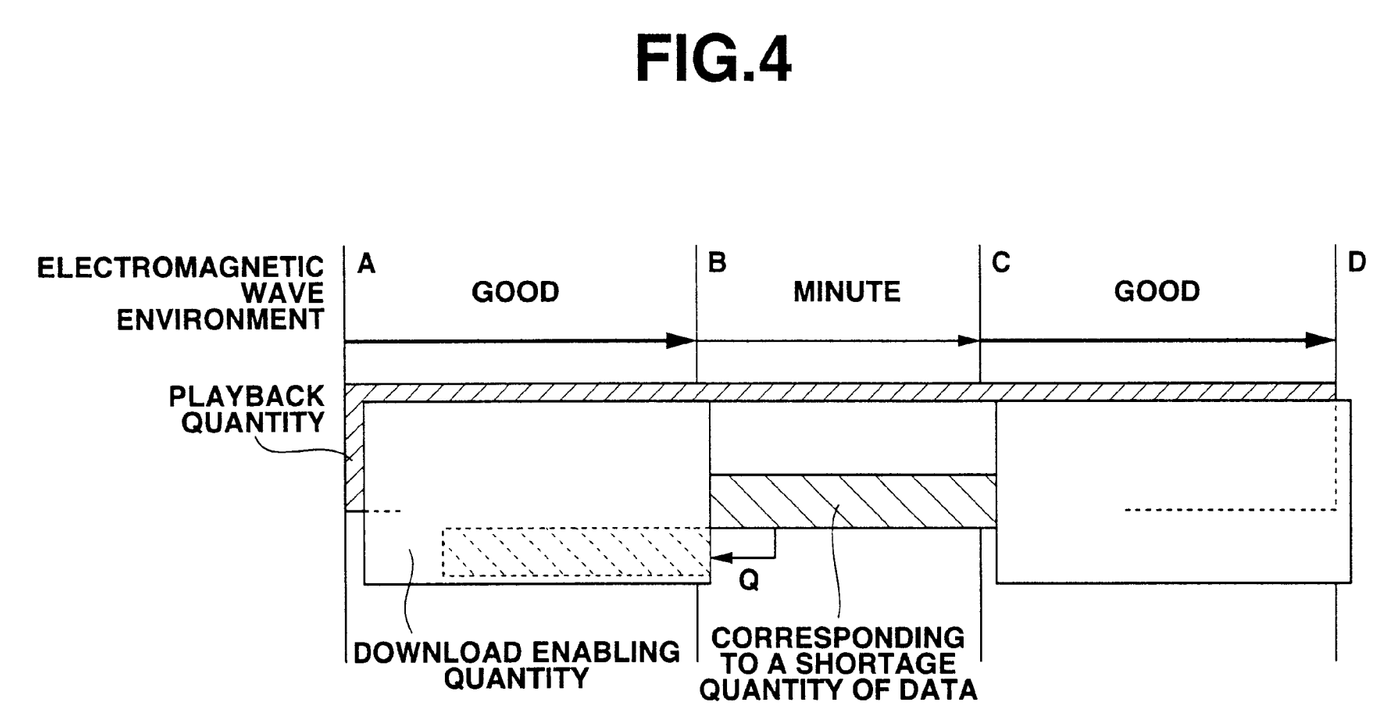
FIG. 4 is an explanatory view for explaining a setting of a receiving buffer capacity at each interval of the traveling scheduled route.

In this case, since the electromagnetic wave environment is favorable (or good) (received level is strong) in the interval of point of place A and of point of place B and in the interval of point of place C and point of place D, as shown in FIG. 4, the communication speed is faster than the play-back speed of the content and it is possible to download the data quantity more than a playback quantity within the same time.

On the other hand, since the electromagnetic wave environment is bad (received level is minute) in the interval of between point of place B and point of place C, the communication speed is slower than the play-back speed of the content, the data quantity required for the play-back cannot be downloaded and the play-back is interrupted in the midway through the complete play-back. Then, communication speed predicting section 7 predicts the communication speed using electromagnetic wave environmental data 28 on the traveling scheduled route and the data whose quantity becomes short at the interval between points of places of B and C at which the electromagnetic wave environment is not favorable shown in FIG. 4 and is buffered when the vehicle travels on the interval between points of places A and B at which the electromagnetic wave environment is favorable as denoted by an arrow Q shown in FIG. 4. Then, when the vehicle travels in the interval in which the electromagnetic wave environment is bad, the buffered data is read so that the interruption of the play-back of the content can be avoided even if the interval between points of places B and C in which the electromagnetic wave environment is bad. Thereafter, the details of the communication control will be described with reference to a control flowchart shown in FIG. 5. Suppose a case wherein the traveling scheduled route is route A→B→C→D shown in FIG. 3.

That is to say, if, at a step 10, a download request of the content is issued, play-back speed retrieving section 8 receives play-back speed Sv (bps) from external content provider 9.

At the next step 112, traveling time predicting section 6 reads the information such as a road attribute of the traveling scheduled route set at traveling route setting section 4 from road map data 27 and predicts the traveling speed on the basis of the read road map data 27. When the traveling speed is predicted, a relationship between the road attribute and traveling speed is used. The information on the relationship is stored in an internal memory of traveling time predicting section 6. On example will be shown below.

| Road attribute | traveling speed |
| --- | --- |
| High-speed road (free way) | 90 Km/h |
| General road | 40 Km/h |
| Narrow street road | 20 Km/h |

Predicted value of the traveling speed of route A→B→C→D of FIG. 3 is V1=40 (Km/h) when the kind of road is the general road at the interval between points of places A and B and V2=20 Km/h when the kind of road is the narrow street road at the interval among points of places B, C, and D. It is noted that a traffic congestion information is received by traffic information retrieving section 5, the traveling speed is lowered than that during an ordinary vehicular run so that the lowered traveling speed is used.

Figure 8:
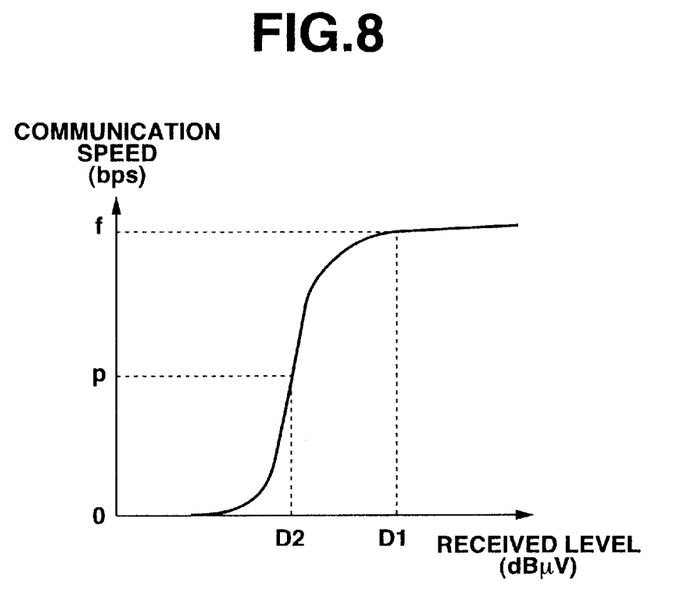
FIG. 8 is a graph representing a relationship between a received signal level and a communication speed.

At a step 113, communication speed predicting section 7 reads the electromagnetic wave received level of a part of data corresponding to traveling scheduled route A→B→C→D shown in FIG. 3 from electromagnetic wave environmental data 38 and predicts the communication speed from this received level. It is noted that a received level of the electromagnetic waves (dB$\mu$V) is used for the electromagnetic wave environmental data 28. The electromagnetic wave received level has a monotonous incremental function with the communication speed (byte/s), as shown by the relationship in FIG. 8. Hence, the communication speed can be estimated from the received level.

Figure 6:
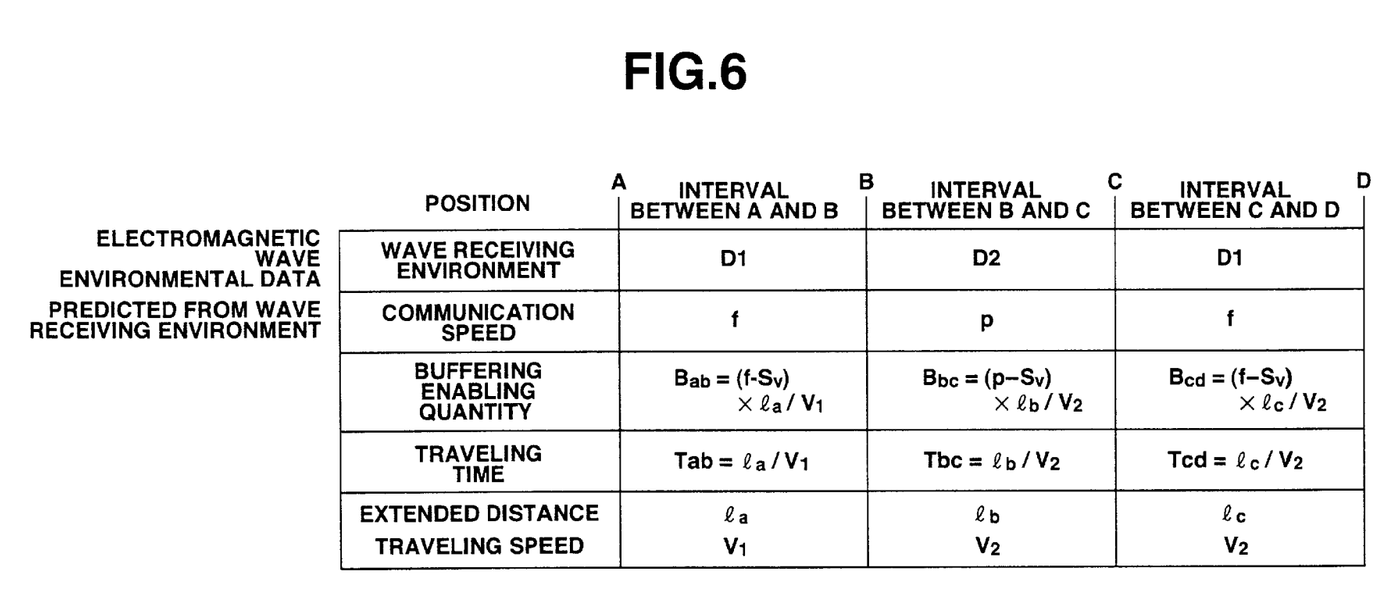
FIG. 6 is an explanatory view for explaining an example of calculation of a buffer enabling quantity at the traveling scheduled route in a case of the first embodiment shown in FIG. 1.

Then, the predicted value of the communication speed in a case where the vehicle runs the route of A→B→C→D in FIG. 3 is as follows: That is to say, the predicted value described above is f (byte/s, byte per second) from the relationship shown in FIG. 8 since, as shown in FIG. 6, the received level is $D_1$ at the intervals between points of places A and B and between points of places C and D. In addition, since received level in the interval between points of places B and C is $D_2$, the predicted value of the communication speed is p (byte/s) from the relationship in FIG. 8.

At a step 114, buffer quantity calculating section 10 divides the traveling scheduled route at a point of place at which the traveling speed predicted at step 112 is varied by a speed value equal to or higher than a predetermined value and at a point of place at which the communication speed is varied by the speed value equal to or higher than the predetermined value to derive each traveling interval. In the case of route A→B→C→D shown in FIG. 3, point of place B at which the predicted values of the traveling speed and communication speed are varied and that C at which the predicted value of the communication speed is varied as respectively pauses.

At a step 115, a buffering enabling quantity Bi (byte) at each interval from the following equation is determined by buffer quantity calculating section 10 using play-back speed Sv (byte/s) of the content retrieved at step 111, communication speed Dv1 at each interval divided at step 114, traveling speed Vi(m/s), and traveling distance Li(m) at each interval. Bi=(Dvi−Sv)×Li/Vi FIG. 6 describes the buffering enabling capacity at each interval determined as described above. In FIG. 6, k since communication speed p (byte/s) is slower than play-back speed Sv (byte/s) of control in the interval between points of places between B and C, buffering enabling quantity Bbc at this interval indicates negative so that the download cannot catch up with the playback, thus playback being interrupted.

At a step 116, download enabling/disabling determining section 12 determines buffering enabling quantity Bi obtained at step 115 indicates negative (namely, a case where the electromagnetic wave received level is minute as in the interval between points of places B and ZC shown in FIG. 3 and the communication speed is slower than the play-back speed of the content). If Bi indicates negative (No) at step 116, the routine shown in FIG. 5 goes to a step 118. If Yes at step 116, the routine shown in FIG. 5 goes to a step 117.

Figure 5:
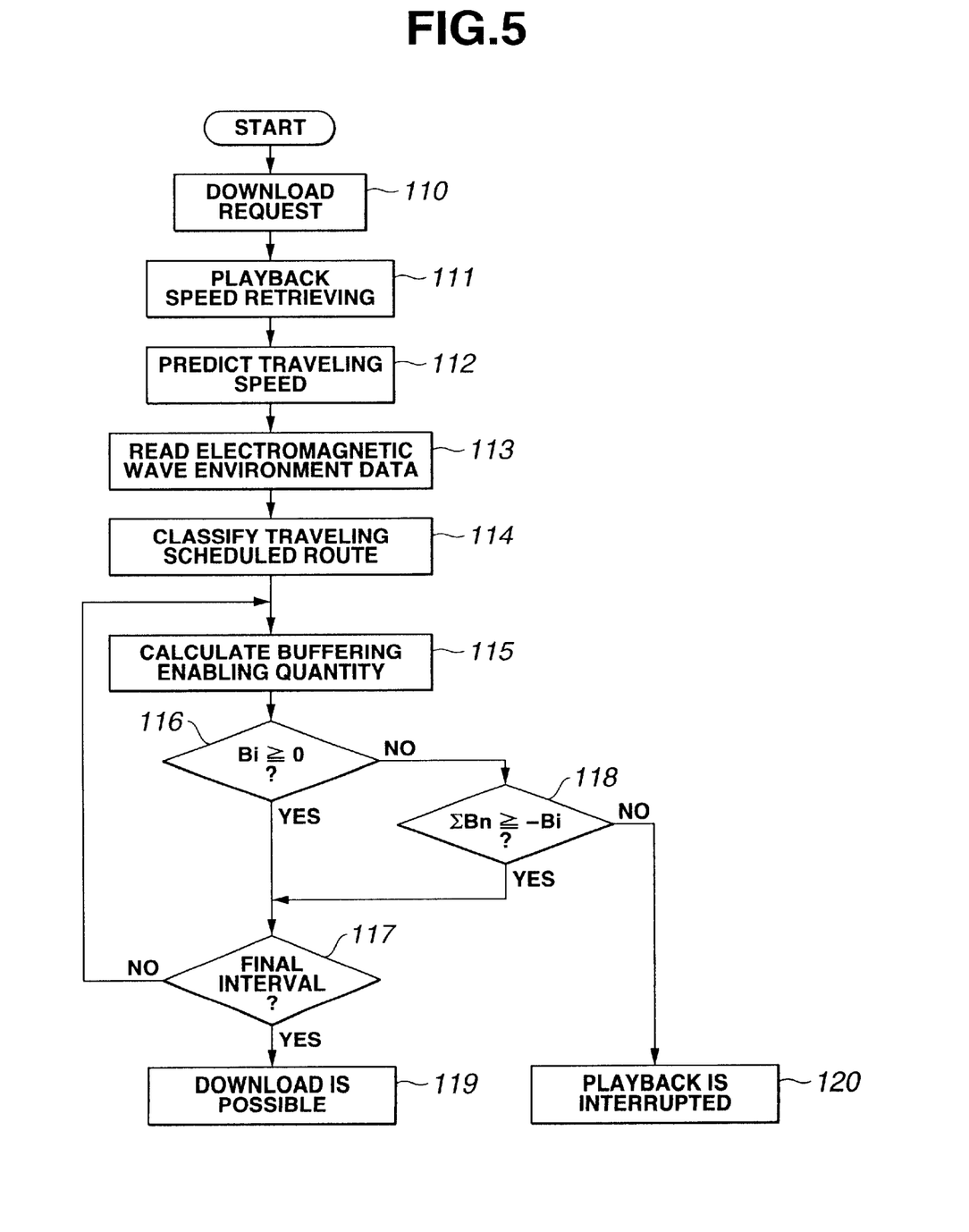
FIG. 5 is an operational flowchart representing a control flow executed in the first embodiment of the communications control apparatus shown in FIG. 1.

At step 117, download enabling/disabling determining section 12 determines whether the interval at which the buffering enabling quantity is derived is a final interval. If No at step 117, the routine returns to step 115 to derive the subsequent buffering enabling quantity. If Yes at step 117, the routine goes to a step 119. At step 119, download enabling/disabling determining section determines that the content requested at the above-described step 110 is download enabled (download is possible) and commands download enabling/disabling displaying section 13 to produce the download being enabled to the vehicle driver.

At step 118, download enabling/disabling section 12 determines whether, in a case where communication speed p (byte/s) is slower than playback speed Sv (byte/s) of the content, a total sum ΣBn (byte) of the buffering enabling quantity at the beforehand interval is equal to or larger than the data shortage quantity–Bi of the data at the same interval. That is to say, download enabling/disabling determining section 12 determines whether, for the route shown in FIG. 3, namely, A→B→C→D, the shortage quantity–(p–Sv)×lb/$V_2$ at the interval between B and C is caught by the buffering enabling quantity at the interval of points of places A and B, hence, the following equation is satisfied.

$$(f-Sv) \times la/V_1 > -(p-Sv) \times lb/V_2.$$

In a case where the above-described inequality is satisfied, the capacity set value of the receiving buffer at the interval between points of places A and B is set to an added (superposed) value of the shortage data quantity at the interval between points of places B and C expressed as–Bbc=(Sv–p)×Ib/$V_2$.

If the above-described inequality is satisfied, the set value of the buffer at the interval between points of places A and B of FIG. 3 is set to an addition value of the set value at the interval between points of places A and B of FIG. 3 to the shortage quantity–Bbc=(Sv–p)×lb/$V_2$ at the interval between points of places B and C. Thus, the routine goes to step 117. If not satisfied (No) at step 118, the routine goes to step 120. At step 120, download enabling/disabling displaying section 13 produces a message to an effect that "the playback is interrupted" according to a command from download enabling/disabling determining section 12.

Figure 7:
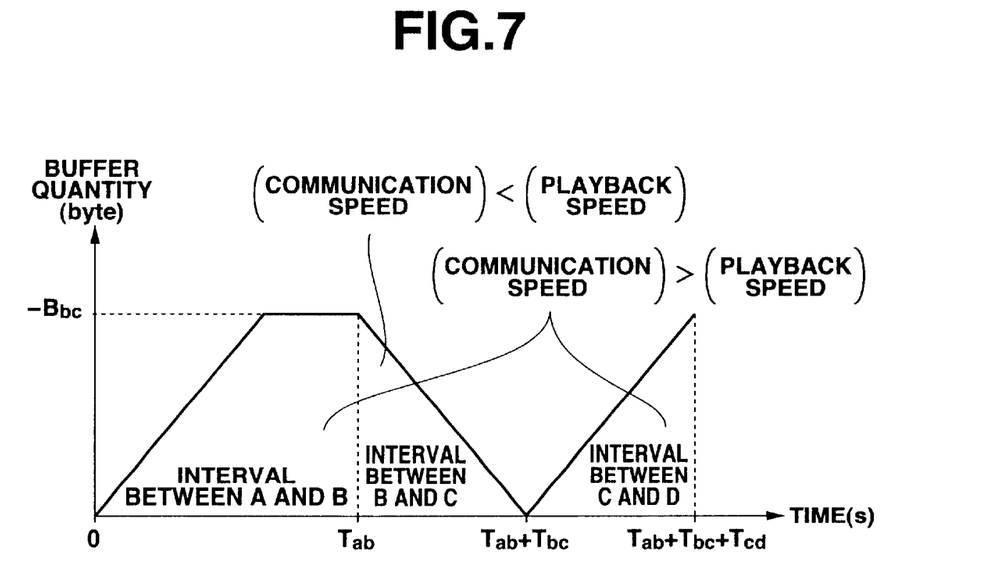
FIG. 7 is an explanatory view representing a changed state of a buffer quantity during a vehicular traveling.

In the first embodiment described above, the shortage data quantity at the interval between points of places B and C is previously buffered when the vehicle travels the interval between points of places A and B in which the electromagnetic wave environment is favorable and the high-speed communication speed can be secured as shown in FIG. 7. When the vehicle travels the interval between points of places B and C, the data reserved in the buffer are used so that the content can be play-backed without the interruption. It is noted that it is necessary to previously store the information quantity which would become short during the vehicular run on the interval between points of places B and C when the vehicle runs on the interval between points of places A and B, in a case where the vehicle travels such a route as A—B→C→D. It is necessary to increase the buffer capacity in accordance with the required storage quantity. If the destination is the point of place D, the shortage data quantity is not developed at the interval between points of places C and D. Hence, the information quantity in accordance with the playback quantity may be stored. It is not necessary to increase the buffer capacity when the vehicle travels on the traveling interval between points of places C and D.

It is noted that if, at step 118 in the control flowchart of FIG. 5, the total sum of ΣBn (byte) of the buffering enabling quantity at the beforehand interval is not equal to or larger than the shartage quantity of data–Bi (No), the routine goes to step 120. At step 120, especially when a terminal position of the interval falls within a constant distance (for example, 1 Km) from the vehicle position, download enabling/disabling displaying section 13 may produce a message to an effect that the terminal position of the corresponding interval is a download enabling position to the driver (viewer). If not so, download enabling/disabling displaying section 13 may produce such a message that "download is not possible (or disabled)" or "playback pause" to the driver.

However, even if download enabling/disabling determining section 12 determines that the vehicle is traveling within the constant distance from the terminal position of the corresponding interval and the playback is interrupted, download enabling/disabling determining section 12 may determine that it takes a lot of time for the vehicle to reach to the terminal position due to the traffic congestion and, therefore, the time required for the download can be secured. At this time, download enabling/disabling determining section may stop of producing the message of "download enabling position".

Figure 9:
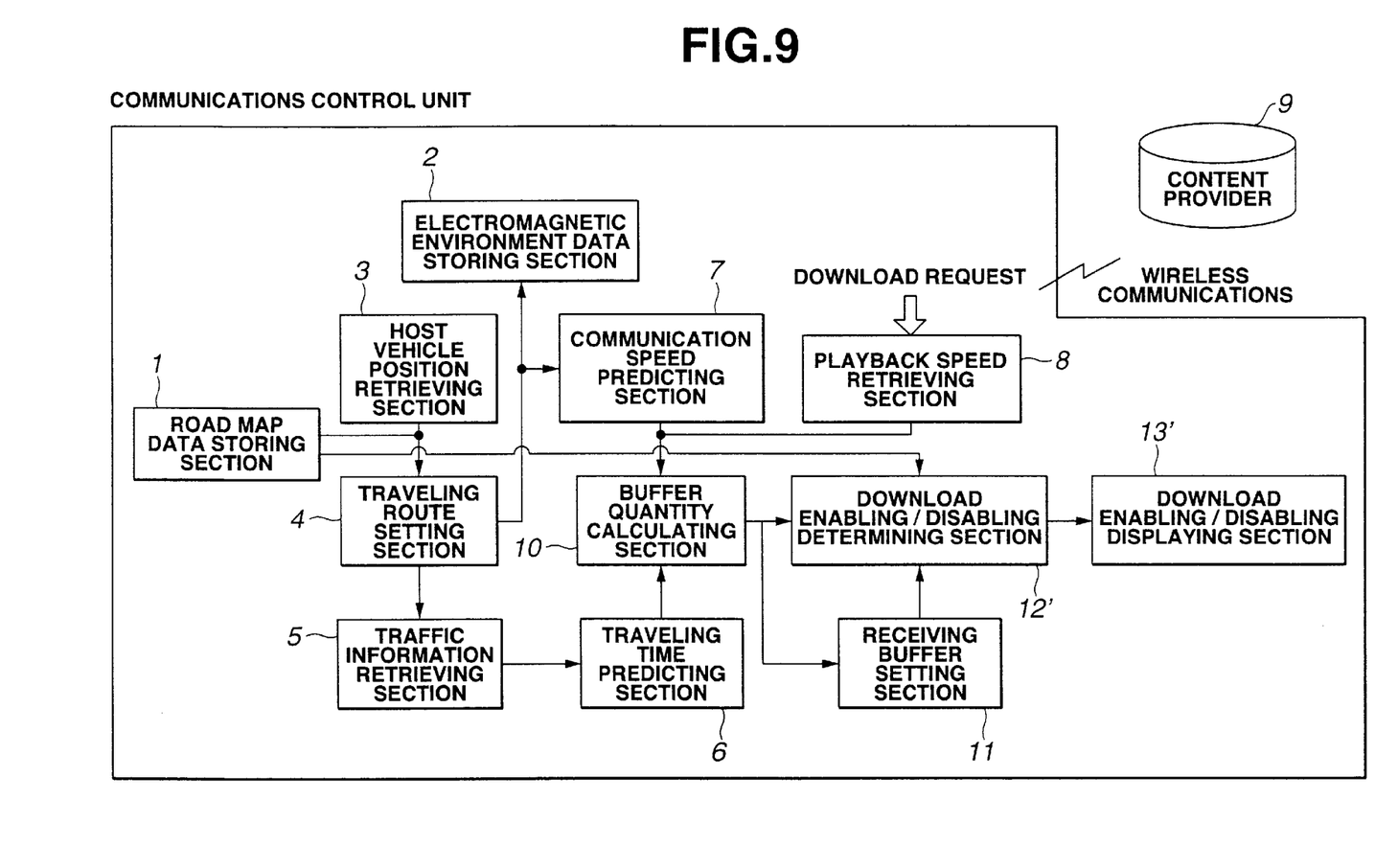
FIG. 9 is a functional block diagram of the communications control apparatus in a second preferred embodiment according to the present invention.

FIG. 9 shows a functional block diagram of the communications control apparatus in a second preferred embodiment according to the present invention.

Figure 10:
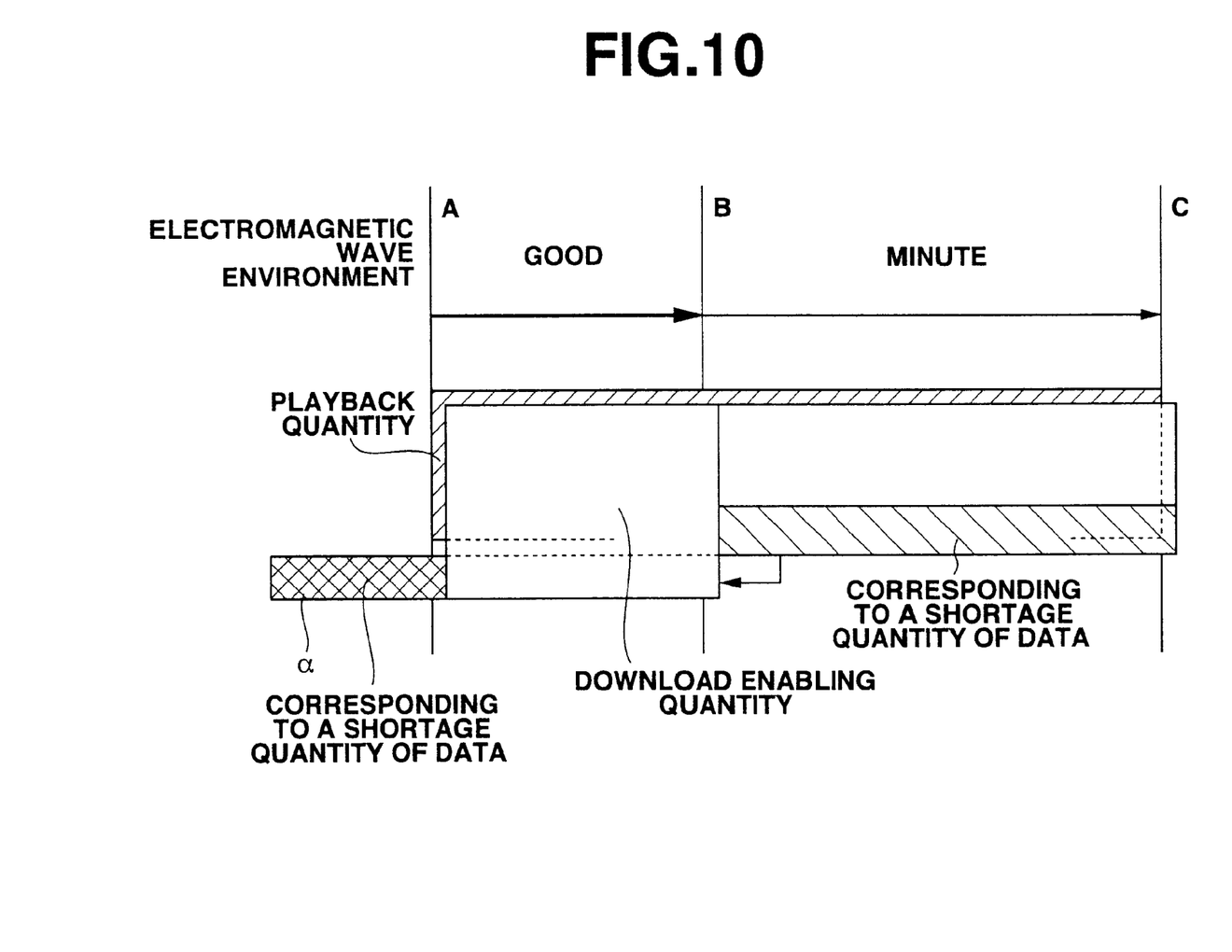
FIG. 10 is an explanatory view representing a countermeasure when the vehicle travels on an interval of the traveling scheduled route at which a buffer capacity becomes insufficient.

As compared with the first embodiment shown in FIG. 2, download enabling/disabling section 12 can read road map data 27 from road map storing section 1. In the second embodiment, the following functions are added to those functions of the first embodiment. That is to say, at first, in a case where the electromagnetic wave environment at the present position of the vehicle is bad and the playback of the content is impossible, a position at which the electromagnetic wave environment is good and the playback of the content is possible is produced to the driver. Secondarily, in a case where the vehicle travels on any one of the intervals at which the electromagnetic wave environment is favorable, as shown in FIG. 10, but the buffering of the shortage quantity of the data to be playbacked is not in time in the subsequent interval in which the electromagnetic environment is bad (in other words, a time for which a quantity of data by which the data required until the vehicle reaches from a location at which a download request is issued to another location at which the electromagnetic wave environment becomes worsened is buffered into the receiving buffer exceeds another time it takes for the vehicle to reach from the location at which the download request is issued to the other location at which the electromagnetic wave environment becomes worsened), download enabling/disabling determining section 12' determines whether a location at which the vehicle can be stopped within the interval in which the electromagnetic wave environment is good and commands the download enabling/disabling displaying section 13' to produce such a message that if the location at which the vehicle can be stopped is present in the interval at which the electromagnetic wave environment is good, the shortage quantity of data buffering is not in time of the vehicular run in the interval in which the electromagnetic wave environment is bad should be buffered at the location described above with the vehicle stopped to the vehicular driver.

The details of the control described above will be described with reference to FIG. 11.

Figure 11:
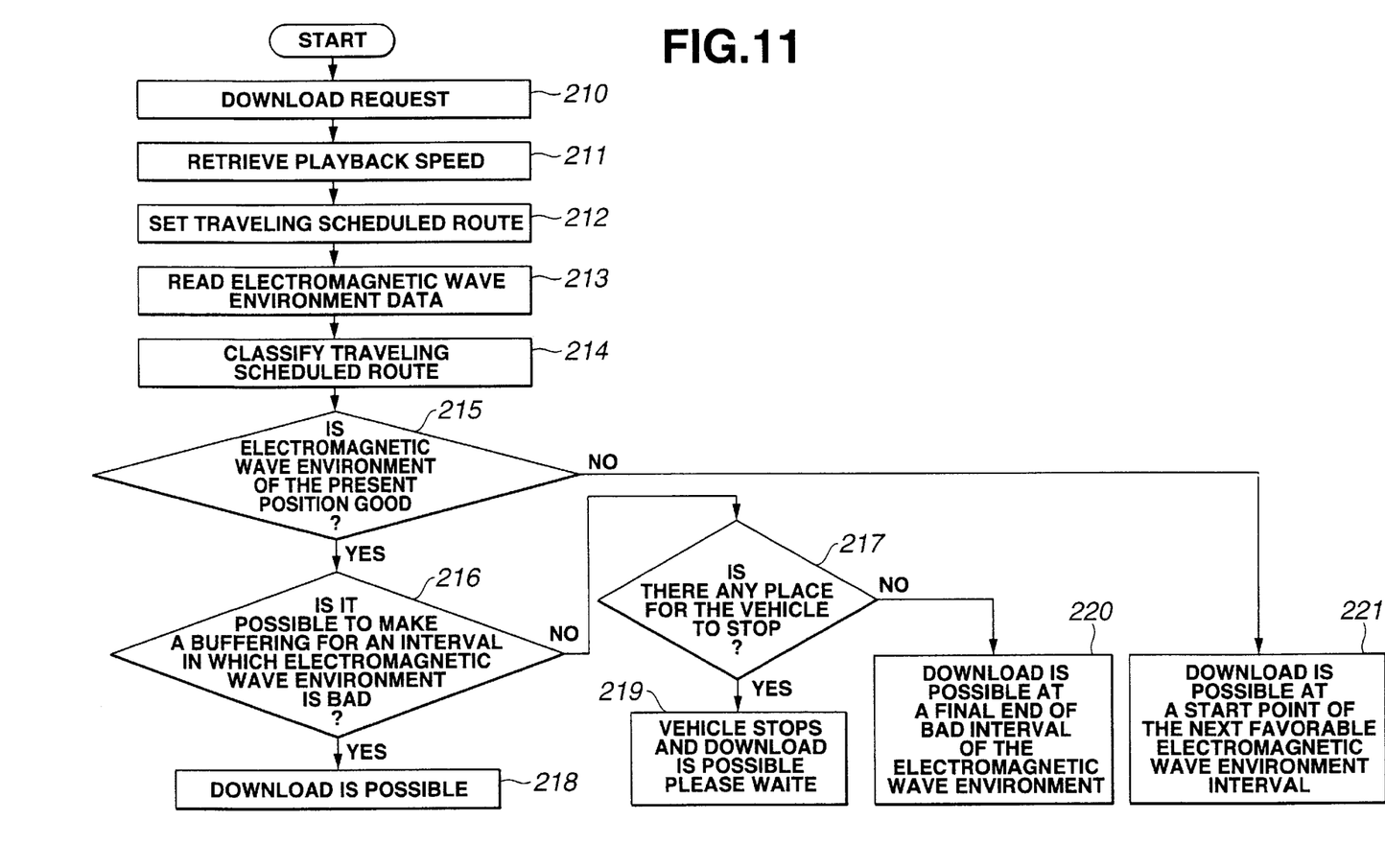
FIG. 11 is an operational flowchart representing the control flow in the case of the second embodiment shown in FIG. 9.

In FIG. 11, since steps 210 through 214 are the same contents as those of steps 110 through 114, the detailed explanation thereof will be omitted herein.

At a step 215, download enabling/disabling determining section 12' determines whether the electromagnetic wave environment at the present position of the vehicle enables the content requested at step 211 to be play-backed, viz., whether communication speed f at the present position of the vehicle is faster than play-back speed Sv of the content. If f>Sv (Yes) at step 215, the routine shown in FIG. 11 goes to a step 216. If f<Sv at step 215, the routine goes to a step 221. At step 221, download enabling/disabling determining section 12 commands download enabling/disabling section 13 to produce such a message that a start point of place of the subsequent interval in which the electromagnetic wave environment becomes favorable and the communication speed becomes faster is the download enabling position to the driver.

At step 216, download enabling/disabling determining section 12 checks to see if the buffering of the shortage quantity of the playback data at the subsequent interval in which the electromagnetic wave environment is bad is possible. If possible, the routine goes to a step 218. At step 218, download enabling/disabling determining section 12 determines that the download is possible and the download of the requested content in which the electromagnetic wave is bad is not possible, the routine goes to a step 217. That is to say, in a case where, for example, the traveling scheduled route shown in FIG. 3 is A→B→C→D, the buffering enabling quantity Bab at the interval between points of places A and B including the present position of the vehicle is compared with an absolute value of the buffering enabling quantity Bbc at the subsequent interval between points of places B and C in which the electromagnetic wave environment is bad. If the absolute value of Bbc is larger than Bab and shortage quantity α which is not in time is developed (No) at step 216, the routine goes to a step 217. download enabling/disabling determining section 12 reads a road situation surrounding the present position of the vehicle from road map data and determines whether a location at which the vehicle can be stopped such as a service area in freeway or road station is placed at a position prior to the position at which the electromagnetic wave environment becomes worse. If the location at which the vehicle can be stopped is present (Yes) at step 217, the routine goes to a step 219. At step 219, download enabling/disabling determining section 12 commands download enabling/disabling section 13 to display such a message that the shortage quantity of the play-back data at the interval in which the electromagnetic wave environment is bad can be buffered including the data shortage quantity of a so that the download of the requested content becomes possible. In details, if, for example, during the vehicular run on the interval between points of places A and B in the route of A→B→C↓D in FIG. 3, the buffering enabling quantity shown in FIG. 6 is expressed as |Bab|<|Bbc|, such a message that road station: vehicle stops→download is enabled is produced to the driver if "road station" is present in the interval between points of places A and B. In addition, after the vehicle is stopped at the road station, such a message that "please wait" until the download of the data whose quantity corresponds to those whose buffering is not in time |Bab−Bbc| (byte) is ended is produced.

On the other hand, if the location at which the vehicle can be stopped is not present, the routine goes from a step 217 to a step 220. At step 220, download enabling/disabling determining section 12 commands download enabling/ disabling displaying section 13 to produce such a message that the download is possible at the terminal of the interval in which the electromagnetic wave environment is bad to the driver through display 23.

Even if the vehicle is present in the interval in which the electromagnetic wave environment is good which is in front of the subsequently coming interval in which the electromagnetic wave environment is bad, the shortage in the buffer enabling quantity of the playback data occurs in the traveling interval in which the electromagnetic wave environment is bad if the vehicle is continued to travel. In this case, in the second embodiment, the location at which the vehicle can be stopped in the traveling interval in which the electromagnetic wave environment is favorable is produced through display 23 to the driver. Consequently, the download of the playback data including the quantity corresponding to the shortage quantity of the buffering becomes possible at the vehicular parked location.

It is noted that, in each embodiment described above, the predicted traveling speed and predicted communication speed are used in the calculation of the data quantity by which the buffering is enabled by buffer enabling quantity calculating section 10. However, in a case where the actual traveling speed and actual communication speed are measured and at least one of the two actually measured speeds is largely deviated from the predicted traveling speed or communication speed (for example, a case where the traveling speed is faster that that of the predicted value by 10% or more or where the communication speed is slower than that of the predicted value by 10% or more), the setting of the buffer capacity may again be carried out. Thus, a more accurate setting of the buffer capacity can be achieved.

In addition, in each embodiment, the case where the traveling scheduled route has already been set has been exemplified. However, even in a case where the traveling scheduled route is not directly set, it becomes possible to further improve a reproducibility (a playback capability) of the stream type content even when the vehicle travels on the traveling interval of the traveling route in which the electromagnetic wave environment is bad and the download cannot be carried out.

In each embodiment, furthermore, the in-vehicle information terminal including the (car) navigation system calculates all necessary calculations including the route from the present position of the vehicle to the destination at which the vehicle is finally to arrive on the basis of GPS electromagnetic waves received by GPS receiving section 24. However, there is no limitation to this. Road map data storing section 1, traveling route setting section 4, and electromagnetic wave environmental data storing section 2 may not be mounted in the vehicle and such a navigation support system that the present position of the vehicle and the destination are transmitted via the communications circuit, a center station calculates the route to the destination, and a result of this calculation is returned to the corresponding terminal via the communications circuit may be used.

In addition, the communication unit 22 utilizes pocket telephone (or handy phone) 29 of the vehicular driver for its communication function part in each embodiment. However, in place of pocket telephone 29, such a communication chip that provides the communications function described above may previously be built in the communications unit 22.

The entire contents of a Japanese Patent Application No. 2001-245671 (filed in Japan on Aug. 13, 2001) are herein incorporated by reference. The scope of the invention is defined with reference to the following claims.

What is claimed is:

1. A communications control apparatus for an automotive vehicle, comprising:
   a road map storing section that stores a road map data;
   an electromagnetic wave environmental data storing section that stores an electromagnetic wave environmental data;
   a vehicular position retrieving section that retrieves a position of the vehicle;

a traveling time predicting section that predicts a traveling time for which the vehicle travels on a traveling scheduled route using the road map data;

a communication speed predicting section that predicts a communication speed when the vehicle travels on the traveling scheduled route using the electromagnetic wave environmental data;

a playback speed retrieving section that retrieves a playback speed of a requested content;

a buffer enabling quantity calculating section that calculates a buffer enabling quantity by which data of the requested content is enabled to be buffered into a receiving buffer during a vehicular run on the traveling scheduled route using the traveling time obtained from the traveling time predicting section and the communication speed obtained from the communication speed predicting section; and a receiving buffer setting section that sets a capacity of the receiving buffer according to a calculated result of the buffer enabling quantity calculating section and an upper limit value of the receiving buffer capacity, the data of the requested content being downloaded onto the receiving buffer whose capacity is set by the receiving buffer setting section.

2. A communications control apparatus for an automotive vehicle as claimed in claim 1, wherein the communications control apparatus further comprises: download enabling/disabling determining section that determines whether the data of the requested content is enabled to be playbacked without interruption when the vehicle travels on the traveling scheduled route using a set value of the receiving buffer capacity by the receiving buffer setting section and the buffer enabling quantity by which the data of the requested content is enabled to be downloaded calculated by the buffer quantity calculating section and a download enabling/disabling displaying section that produces a result of a determination by the download enabling/disabling determining section to a viewer.

3. A communications control apparatus for an automotive vehicle as claimed in claim 2, wherein the download enabling/disabling determining section, when determining that the data of the requested content is disabled to be downloaded at a location at which a download request is issued, derives a position at which the data of the requested content is enabled to be downloaded and produces the position at which the data of the requested content is enabled to be downloaded to the viewer through the download enabling/disabling displaying section.

4. A communications control apparatus for an automotive vehicle as claimed in claim 3, wherein the download enabling/disabling determining section limits the position at which the data of the requested content is enabled to be downloaded and which is displayed by the download enabling/disabling displaying section to that within a predetermined distance from the position of the vehicle.

5. A communications control apparatus for an automotive vehicle as claimed in claim 2, wherein the download enabling/disabling determining section produces a predetermined message through the download enabling/disabling displaying section to inform that a quantity of the data of the requested content required to be playbacked during the vehicular run at an interval of the traveling scheduled route at which the electromagnetic wave environment is worsened, with a situation of the position of the vehicle retrieved by the road map data taken into consideration, when a time for which a quantity of data by which the data required until the vehicle reaches from a location at which a download request is issued to another location at which the electromagnetic wave environment becomes worsened is buffered into the receiving buffer exceeds another time it takes for the vehicle to reach from the location at which the download request is issued to the other location at which the electromagnetic wave environment becomes worsened.

6. A communications control apparatus for an automotive vehicle as claimed in claim 1, wherein the buffer enabling quantity calculating section calculates the buffer enabling quantity by which the data of the requested content is enabled to be buffered for each interval of the traveling scheduled route and the receiving buffer setting section sets the receiving buffer capacity for each interval of the traveling scheduled route.

7. A communications control apparatus for an automotive vehicle as claimed in claim 6, wherein each interval of the traveling scheduled route is paused at at least one of points of places at which a traveling speed of the vehicle is varied by a rate equal to or higher than a predetermined value and at which the communication speed is varied at a rate equal to or higher than another predetermined value.

8. A communications control apparatus for an automotive vehicle as claimed in claim 6, wherein the traveling scheduled route comprises at least two intervals and the traveling time predicting section predicts the traveling time for each interval from a predicted traveling speed within each interval and a predicted traveling distance therewithin according to a relationship between the traveling speed of the corresponding one of the intervals and a road attribute on the road map data and the communication speed predicting section predicts the communication speed for each interval from the electromagnetic wave environmental data related to each interval.

9. A communications control apparatus for an automotive vehicle as claimed in claim 8, wherein the electromagnetic wave environmental data comprises electromagnetic received level data representing an electromagnetic wave received level at each interval in $dB\mu B$.

10. A communications control apparatus for an automotive vehicle as claimed in claim 8, wherein the buffer enabling quantity calculating section calculates the buffer enabling quantity for each interval as follows:

$B_i = (D_{vi} - S_v) \times L_i / V_i$, wherein $D_{vi}$ denotes the communication speed at interval $i$, $S_v$ denotes the playback speed, $L_i$ denotes the traveling distance at interval $i$, $V_i$ denotes the traveling speed at interval $i$.

11. A communications control apparatus for an automotive vehicle as claimed in claim 10, wherein the communications control apparatus further comprises a download enabling/disabling determining section that determines whether the data of the requested content required at each of the intervals is enabled to be downloaded according to whether the buffer enabling quantity $B_i$ calculated by the buffer enabling quantity calculating section is positive or negative.

12. A communications control apparatus for an automotive vehicle as claimed in claim 11, wherein the download enabling/disabling determining section comprises a final interval determining section that determines whether the interval at which the, buffer enabling quantity $B_i$ is determined to be positive or negative is a final interval of the traveling scheduled route and the communications control apparatus further comprises a download enabling/disabling displaying section that produces a message to an effect that the data of the requested content is enabled to be downloaded when the buffer enabling quantity $B_i$ is determined to be positive for the final interval.

13. A communications control apparatus for an automotive vehicle as claimed in claim 12, wherein the download enabling/disabling determining section further comprises a data quantity determining section that determines whether a total ($\Sigma Bn$) of the buffer enabling quantity of one interval before the vehicle enters the other interval at which the buffer enabling quantity Bi is negative is equal to or larger than minus buffer enabling quantity–Bi which corresponds to a shortage quantity of the data to be buffered at the other interval, when the buffer enabling quantity Bi at the other interval is negative.

14. A communications control apparatus for an automotive vehicle as claimed in claim 13, wherein, when $\Sigma Bn \geq -Bi$, a minus shortage quantity–Bi of the data to be downloaded at the other interval is added to a set value of the capacity of the receiving buffer by the receiving buffer setting section.

15. A communications control apparatus for an automotive vehicle as claimed in claim 14, wherein, when $\Sigma Bn < -Bi$, the download enabling/disabling determining section produces a message to the effect that the playback is interrupted through the download enabling/disabling displaying section.

16. A communications control apparatus for an automotive vehicle as claimed in claim 1, wherein the traveling time predicting section uses a traveling speed set in association with the road map data stored in the road map storing section to derive the traveling time.

17. A communications control apparatus for an automotive vehicle as claimed in claim 1, wherein the communications control apparatus further comprises a traffic information retrieving section that retrieves a traffic information by a communication and wherein the traveling time predicting section refers to the traveling speed based on the traffic information retrieved by the traffic information retrieving section.

18. A communications control apparatus for an automotive vehicle as claimed in claim 1, wherein the buffer enabling quantity calculating section calculates again the required buffer enabling quantity and commands the receiving buffer setting section to set again the capacity of the receiving buffer when at least one of an actual traveling speed and an actual communication speed is different from the predicted traveling time and communication speed by a predetermined value or more.

19. A communications control apparatus for an automotive vehicle, comprising:

road map storing means for storing a road map data;

electromagnetic wave environmental data storing means for storing an electromagnetic wave environmental data;

vehicular position retrieving means for retrieving a position of the vehicle;

traveling time predicting means for predicting a traveling time for which the vehicle travels on a traveling scheduled route using the road map data;

communication speed predicting means for predicting a communication speed when the vehicle travels on the traveling scheduled route using the electromagnetic wave environmental data;

playback speed retrieving means for retrieving a playback speed of a requested content;

buffer enabling quantity calculating means for calculating a buffer enabling quantity by which data of the requested content is enabled to be buffered into a receiving buffer during a vehicular run on the traveling scheduled route using the traveling time obtained from the traveling time predicting means and the communication speed obtained from the communication speed predicting means; and receiving buffer setting means for setting a capacity of the receiving buffer according to a calculated result of the buffer enabling quantity calculating means and an upper limit value of the receiving buffer capacity, the data of the requested content being downloaded onto the receiving buffer whose capacity is set by the receiving buffer setting means.

20. A communications control method for an automotive vehicle, comprising:

storing a road map data;

storing an electromagnetic wave environmental data;

retrieving a position of the vehicle;

predicting a traveling time for which the vehicle travels on a traveling scheduled route using the road map data;

predicting a communication speed when the vehicle travels on the traveling scheduled route using the electromagnetic wave environmental data;

retrieving a playback speed of a requested content;

calculating a buffer enabling quantity by which data of the requested content is enabled to be buffered into a receiving buffer during a vehicular run on the traveling scheduled route using the traveling time obtained during the traveling time predicting and the communication speed obtained during the communication speed predicting; and setting a capacity of the receiving buffer according to a calculated result of the buffer enabling quantity calculating section and an upper limit value of the receiving buffer capacity, the data of the requested content being downloaded onto the capacity set receiving buffer.

* * * * *